(12) United States Patent
Bradshaw (10) Patent No.: US 11,300,151 B2
(45) Date of Patent: *Apr. 12, 2022

(54) SEGMENTED NUT

(71) Applicant: Segnut Pty Ltd, Mandurah (AU)

(72) Inventor: Brian Bradshaw, Mandurah (AU)

(73) Assignee: Segnut Pty Ltd, Mandurah (AU)

( * ) Notice: Subject to any disclaimer, the term of this patent is extended or adjusted under 35 U.S.C. 154(b) by 0 days.

This patent is subject to a terminal disclaimer.

(21) Appl. No.: 16/573,160

(22) Filed: Sep. 17, 2019

(65) Prior Publication Data

US 2020/0018344 A1 Jan. 16, 2020

Related U.S. Application Data

(63) Continuation of application No. 15/537,470, filed as application No. PCT/AU2015/050803 on Dec. 17, 2015, now Pat. No. 10,533,598.

(30) Foreign Application Priority Data

Dec. 19, 2014 (AU) ................................. 2014905155
Apr. 2, 2015 (AU) ................................. 2015901217

(51) Int. Cl.
*F16B 37/08* (2006.01)
*F16B 23/00* (2006.01)

(52) U.S. Cl.
CPC ...... *F16B 37/0892* (2013.01); *F16B 23/0038* (2013.01)

(58) Field of Classification Search
CPC .................................................. F16B 37/0892

USPC .................................................. 411/432, 433
See application file for complete search history.

(56) References Cited

U.S. PATENT DOCUMENTS

| | | | |
|---|---|---|---|
| 1,081,239 A | 1/1913 | Lantz | |
| 1,879,421 A * | 9/1932 | Nalle | B60B 33/0002 16/19 |
| 2,001,244 A * | 5/1935 | Ezell | F16L 37/1215 285/34 |
| 2,463,179 A * | 3/1949 | Iftiger, Sr. | F16B 37/0864 285/34 |
| 2,489,613 A * | 11/1949 | Beswick | F16B 37/0864 411/433 |
| 2,736,227 A * | 2/1956 | Stroble | F16B 37/0864 411/433 |
| 3,952,626 A | 4/1976 | Townsend | |
| 4,737,059 A * | 4/1988 | Batten | F16B 37/0864 411/433 |
| 4,902,046 A | 2/1990 | Maloberti | |
| 4,930,961 A * | 6/1990 | Weis | F16B 37/0864 411/266 |
| 5,027,678 A | 7/1991 | McCollom | |

(Continued)

FOREIGN PATENT DOCUMENTS

CN 201763762 U 3/2011

OTHER PUBLICATIONS

U.S. Appl. No. 15/537,470, filed Jun. 19, 2017.

*Primary Examiner* — Gary W Estremsky
(74) *Attorney, Agent, or Firm* — Kusner & Jaffe (57) ABSTRACT

A segmented nut is formed by three segments held together with a sleeve for transport and fastening use. Rotation of the sleeve, such as in the order of 60°, frees the segments, allowing for quick release of the nut.

17 Claims, 7 Drawing Sheets

(56) References Cited

U.S. PATENT DOCUMENTS

| | | | | |
|---|---|---|---|---|
| 5,139,381 A | * | 8/1992 | Lubreski | F16B 37/0857 |
| | | | | 411/267 |
| 5,466,106 A | * | 11/1995 | Bone | B24B 45/006 |
| | | | | 411/267 |
| 5,755,544 A | | 5/1998 | Muller et al. | |
| 5,944,467 A | * | 8/1999 | Yuta | F16B 37/0842 |
| | | | | 411/270 |
| 6,033,169 A | * | 3/2000 | Bettger | F16B 37/0857 |
| | | | | 411/267 |
| 6,053,655 A | * | 4/2000 | Mazhar | F16B 37/08 |
| | | | | 403/320 |
| 8,061,945 B2 | * | 11/2011 | Smith | F16B 37/0857 |
| | | | | 411/267 |
| 8,540,471 B2 | | 9/2013 | Dvorak | |
| 9,637,893 B2 | * | 5/2017 | Lin | F16B 37/0864 |
| 10,533,598 B2 | * | 1/2020 | Bradshaw | F16B 37/0892 |
| 2005/0254919 A1 | * | 11/2005 | Takahashi | B24B 45/006 |
| | | | | 411/369 |
| 2010/0166525 A1 | | 7/2010 | Dvorak | |
| 2012/0177463 A1 | * | 7/2012 | Warkotsch | F16B 37/0864 |
| | | | | 411/433 |

\* cited by examiner

SEGMENTED NUT

RELATED APPLICATIONS

The present application is a continuation of U.S. application Ser. No. 15/537,470, filed Jun. 19, 2017, which is a U.S. National Stage Application of International Application No. PCT/AU2015/050803, filed Dec. 17, 2015, which claims priority from Australian Patent Application No. 2014905155, filed Dec. 19, 2014 and Australian Patent Application No. 2015901217, filed Apr. 2, 2015, said patent applications hereby fully incorporated herein by reference.

FIELD OF THE INVENTION

The present invention relates to a segmented nut or split nut, for use in conjunction with a bolt, allowing for quick release of the nut from the bolt.

BACKGROUND TO THE INVENTION

The use of threaded nuts to tighten onto bolts is well known. In a conventional fashion nuts are tightened by threaded rotation in one direction, and loosened by threaded rotation in the other direction.

In some environments conventional loosening of nuts becomes difficult or impossible. Over time a nut can bind to a bolt, or have corrosion or other damage done to the thread of the nut and/or bolt, particularly to the exposed section of the thread, which prevents nut removal. Frequently it becomes necessary to cut the nut away, mechanically or by use of an oxyacetylene torch or similar. Such an action is time consuming, and can raise significant safety concerns.

In other situations the nut may loosen to an extent, but there may be sufficient friction between nut and bolt for applied rotation to the nut to cause rotation of the nut-and-bolt together. It can be difficult or time consuming to restrain a head of the bolt while removing the nut. Indeed, in some situations there may be intervening structures between the bolt head and the nut, meaning that removal of the nut becomes a two-person operation, requiring coordination and sometimes the erection of access platforms. To avoid this situation, many industrial environments dictate cutting of a nut as standard practice.

In addition to man-power and safety concerns, other adverse consequences can arise from the requirement to cut nuts using oxyacetylene torches. It is often desirable to use anti-rotation devices, such as a polymer insert (a 'nyloc') within a nut. In environments where oxyacetylene cutting of nuts is required, the use of such inserts is banned, and other solutions for anti-rotation problems must be found.

Segmented nuts, being nuts formed in two or three circumferentially arranged pieces, are known. In one common type, the pieces are connected by thin webs. This allows a segmented nut to function as a normal nut during fastening, but allows it to be readily broken into pieces for quick removal. This is considered particularly advantageous in adverse environment conditions such as those described above.

This type of segmented nut has limitations. In particular, it can be difficult to achieve an appropriate balance between the strength required to maintain the nut in position in use, and the ease with which the webs can be broken for removal.

Another known type of segmented nut is formed from circumferentially arranged pieces held together by a surrounding collar. In this nut, the collar contains clamping screws which apply a radial force to the nut segments, forcing them together. Release of the clamping screws allows radial movement of the nut pieces away from the bolt. The threads of the clamping screws in these bolts can suffer the same problems as the nut threads, being liable to corrode or otherwise seize within the collar. Additionally, they are necessarily considerably smaller than the nut and thus require an additional degree of dexterity and finesse to remove. This is not always convenient or indeed possible.

In an alternative design, attempts have been made to form a segmented nut from circumferentially arranged pieces held together by an axially moveable collar. In such a design, the idea is that the collar is slid in an axial direction in order to release the nut pieces. Such nuts are highly problematic, in use. It can be difficult to achieve sufficient purchase on the sleeve in order to provide a suitable axial force. In corrosive environments the necessary axial force can be considerable, and as will be appreciated applying axial forces to an annular surface in a confined space can be difficult if not impossible.

The present invention seeks to address some of the limitations of prior segmented nuts.

SUMMARY OF THE INVENTION

According to one aspect of the present invention there is provided a segmented nut having at least two sections, each section having a concave internal surface and an outer surface, such that the sections combine to form an inner nut having a cylindrical internal surface which is threaded and an outer surface; the segmented nut also including a sleeve arranged to locate around the inner nut, the sleeve being movable by rotation between a locked position and a release position, the sleeve having an internal surface having at least one bearing surface arranged to bear against the inner nut when in the locked position and thus maintain the sections in fixed relationship to each other, and wherein movement of the bearing surface relative to the inner nut causes the sleeve to move into the release position in which at least one section is able to move in a radial direction.

In a preferred embodiment, the movement of the sleeve from the locked to the release position is generally in a tightening direction of the nut.

Alternatively, the movement of the sleeve from the locked to the release position may be generally in a loosening direction of the nut.

It is preferred that the rotational movement is not threaded rotation.

The movement of the sleeve from the locked to the release position may be rotation of the sleeve relative to the inner nut. Alternatively, the movement of the sleeve from the locked to the release position may be in an axial direction, preferably towards a head of a bolt or other workpiece. It is also possible that the movement may be for rotation and axial movement, for instance using threaded engagement between the inner nut and the sleeve.

The movement of the nut section in a radial direction may be by a distance greater than the depth of the thread on the inner surface of the inner nut. Alternatively, the nut section may be constrained to move less than this distance.

In one embodiment of the invention, the outer surface of the inner nut and the internal surface of the sleeve are generally polygonal in cross section. It is preferred that the polygon defined by the internal surface of the sleeve is larger than that defined by the external surface of the inner nut, such that when the two polygons are parallel the sleeve is spaced from the inner nut. The distance between opposed sides of the polygon defined by the inner surface of the sleeve is less than the distance between opposed vertices of the outer surface of the inner nut. In this way the bearing surfaces of the sleeve may be located along each side of the polygon defined by the internal surface of the sleeve. It is preferred that the bearing surfaces are about midway along each side of this polygon.

The vertices of the polygon defined by the external surface of the inner nut may be rounded, for instance so as to be part-cylindrical about a central axis of the inner nut. In this embodiment, it is preferred that the bearing surfaces of the sleeve are rounded to be complementary in size and shape to the rounded vertices. Advantageously, this allows for bearing between the sleeve and the inner nut to occur over a face, rather than in a single line. The rounded bearing surfaces may extend circumferentially about 5° to 10°.

Alternatively, the vertices of the polygon defined by the external surface of the inner nut may be part-hexagonal. Advantageously, this allows for the inner nut to have a periphery which can be readily grasped by common tools.

Preferably, each side of the polygon defined by the external surface of the inner nut is concave. Preferably each side of the polygon defined by the internal surface of the sleeve is convex. Advantageously, when the sleeve is in the locked position there is therefore a generally triangular gap between each side of the inner nut and an associated vertex of the sleeve.

The polygons of both the inner nut and sleeve are preferably regular hexagons.

It is preferred that movement between the locked and release positions can be effected by rotation through less than 90°. It is further preferred that this movement can be effected through less than 45°. It is still further preferred that this movement can be effected through less than 30°. In a most preferred embodiment, movement between the locked and release positions can be effected by rotation through an angle in the order of 10°.

Preferably, the nut is assembled by press fitting the sections into the sleeve in the locked position. The inner nut and/or the sleeve may include deformable portions such as burrs which assist to hold the sections in rotational position once assembled. The internal thread of the inner nut may be formed in the threads prior to assembly, or may be machined into the inner nut following assembly.

Advantageously, the nut can be assembled during manufacture, with no further assembly required before use.

It is preferred that the nut include a plurality of gaps between the inner nut and the sleeve when in the locked position. These gaps may be filled with a potting material such as silicone to assist in maintaining the nut in the locked position, and/or to prevent the ingress of debris into the gaps.

A holding pin may be provided to locate within at least one gap to assist in maintaining the nut in the locked position. The pin may be associated with an outer grasping portion enabling the pin to be pulled in an axial direction out of its gap, prior to releasing the nut. Alternatively, the sleeve or the inner nut may include a pin receiving recess into which the pin can be pushed out of its gap.

The nut may be provided with a torque applying tool arranged to provide torque to the inner nut via the gaps.

The inner nut sections may each include a collar section at an outer end thereof, arranged to form an annular collar when the inner nut is assembled. The annular collar preferably has an outer diameter greater than the distance between opposed sides of the sleeve, and may act as a lip to assist in locating the sleeve in a desired axial position relative to the inner nut. The collar may also provide a surface which can be gripped during machining of the nut.

The inner nut may have an axial length inside the sleeve similar to that of the sleeve. Alternatively, the inner nut may have an axial length greater than that of the sleeve. In such an embodiment the inner nut may have an extending portion axially adjacent the sleeve, preferably permitting grasping of the inner nut by a standard tool such as a spanner or socket.

The threaded portion of the inner nut may extend through the entire nut. Alternatively, the threaded portion of the inner nut may have an axial length less than or equal to that of the inner sleeve. Preferably the threaded portion of the inner nut is within the axial extend of the outer sleeve.

The sleeve may have a polygonal outer surface suitable for grasping with a standard tool such as a spanner. Alternatively, the sleeve may have a non-polygonal outer surface, such as a circular outer surface, with grasping surfaces provided for use with a dedicated tool.

The nut may include a biasing means arranged to urge the sections apart when in the release position. The biasing means may be formed by a conical washer compressed, in use, within the annular collar. Alternative biasing means could include the use of springs such as leaf springs located between adjacent sections.

The inner nut may include a non-threaded portion an outer edge thereof arranged to receive an anti-rotation device such as a 'nyloc' insert. The anti-rotation device may be cut into segments corresponding to the nut sections. Thus cutting could be done, for instance, during machining of the internal thread. Alternatively, the cutting could be done during application of the insert.

In an alternative embodiment of the invention, the outer surface of the inner nut and the internal surface of the sleeve may both be generally cylindrical, and threaded in a complementary fashion. In this embodiment it is preferred that the threads of the internal surface of the sleeve are oriented in the opposite direction to those of the internal surface of the sections; that is, that the threads of the sleeve are 'left handed' whereas those of the internal surface of the sections are 'right handed'.

The complementary threads may be tapered, rolled or otherwise arranged to reduce any wedging effect caused as the sections begin to separate while still being held together at an inner end.

The sections may have an axial length greater than that of the sleeve. In this way, the nut may be tightened by use of a spanner directly around the sections, rather than around the sleeve.

BRIEF DESCRIPTION OF THE DRAWINGS

It will be convenient to further describe the invention with reference to preferred embodiments of the present invention. Other embodiments are possible, and consequently the particularity of the following discussion is not to be understood as superseding the generality of the preceding description of the invention. In the drawings:

FIG. 15b is a side cross section of the segmented nut of FIG. 15a;

FIG. 16b is a side cross section of the segmented nut of FIG. 16a;

FIG. 17b is a side cross section of the segmented nut of FIG. 17a;

FIG. 18b is a side cross section of the segmented nut of FIG. 18a;

FIG. 19a is an enlarged view of a portion of an inner nut from within the segmented nut of FIG. 15a;

FIG. 19b is a further enlarged view of the circled portion of FIG. 19a;

FIG. 20b is an end view of a nut formed using the nut sections of FIG. 20a;

DETAILED DESCRIPTION OF PREFERRED EMBODIMENTS

Figure 1:
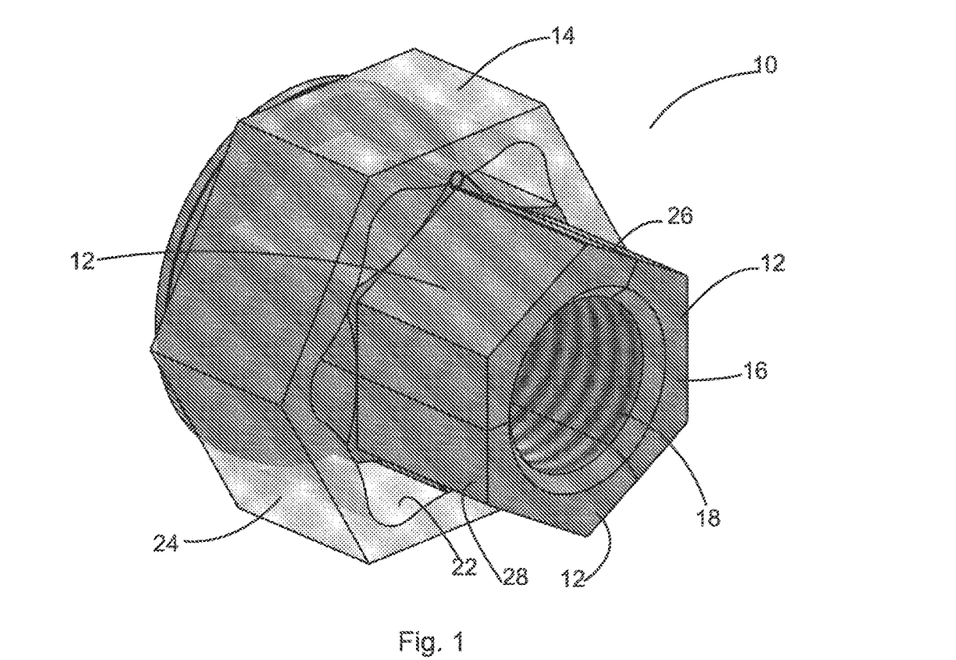
FIG. 1 is a perspective of a segmented nut in accordance with a first embodiment of the present invention.
Figure 2:
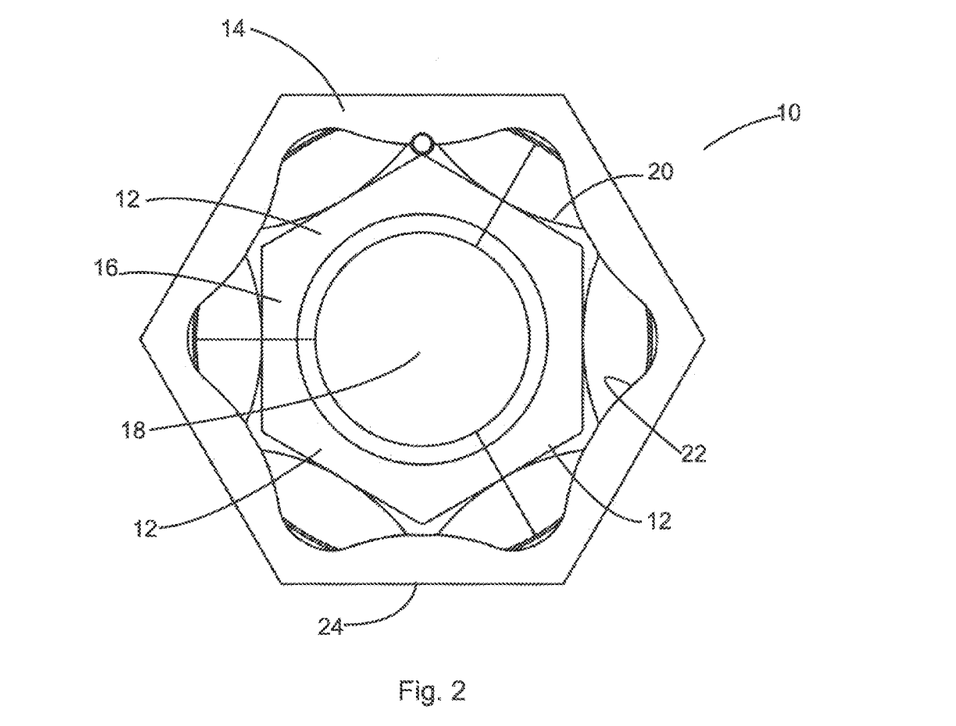
FIG. 2 is an end view of the segmented nut of FIG. 1.
Figure 3:
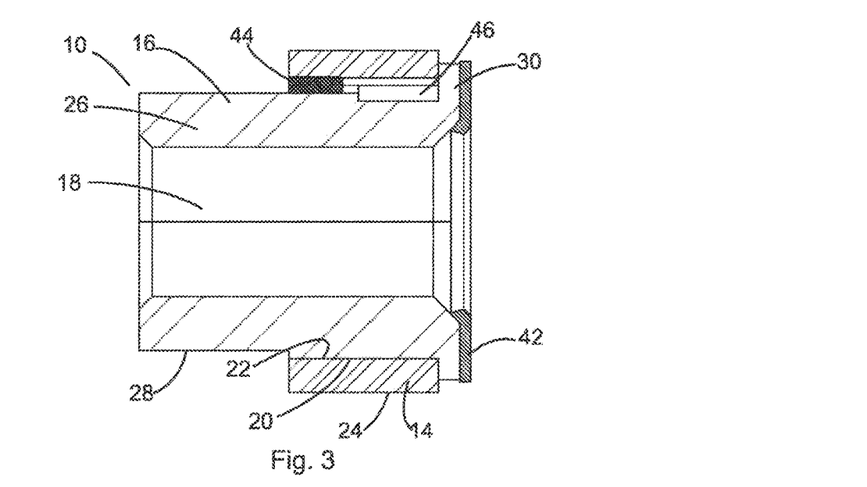
FIG. 3 is a side cross section of the segmented nut of FIG. 1.

Referring to the Figures, FIGS. 1 to 3 show a segmented nut 10 formed by three nut sections 12 and an outer sleeve 14.

Each nut section 12 extends through an arc of 120°, with a concave inner surface and a generally convex outer surface. When placed together, as shown in FIGS. 1 to 3, the nut sections 12 combine to form an inner nut 16. The inner nut 16 has a cylindrical internal bore 18, formed by the concave inner surfaces, which is threaded (in this case using a conventional tapered v-thread) so as to be received about the threaded end of a bolt or other externally threaded member.

The inner nut 16 has an outer surface 20 which is generally polygonal in cross section, being based on a regular hexagon in the embodiment shown. Each of the generally convex outer surfaces of the nut sections 12 includes one full hexagon side, and two half hexagon sides.

The outer sleeve 14 is generally annular in cross section, with an internal surface 22 and an external surface 24. Both the internal surface 22 and the external surface 24 have a cross sectional shape based on a regular hexagon, with the internal surface 22 being larger in dimension than the outer surface 20 of the inner nut 16.

The outer sleeve 14 has an axial length approximately half that of the inner nut 16. This means that the inner nut 16 has an extending portion 26 which extends from the outer sleeve 14 to an outer end of the nut 10. The extending portion 26 has an outer surface 28 which is a true regular hexagon, adapted to be engaged by a conventional spanner or socket.

The inner nut 16 also includes a radial collar 30 located, in use, at an inner end of the nut 10 adjacent the sleeve 14. The radial collar 30 is annular, with an external radius greater than the distance between opposed sides of the sleeve 14. The sleeve 14 is thus prevented from moving axially past the collar 30.

Figure 4:
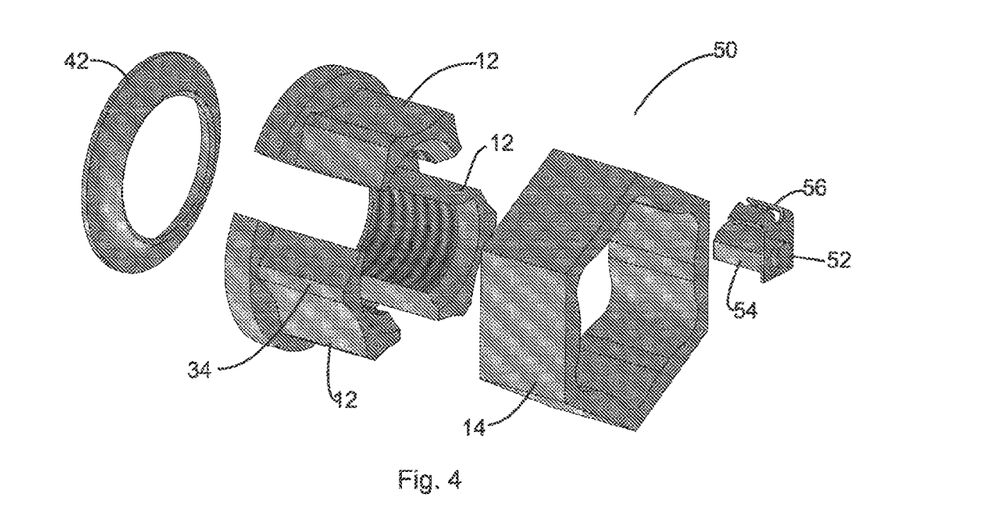
FIG. 4 is an exploded view of a segmented nut in accordance with a second embodiment of the present invention.

FIG. 4 shows an alternative segmented nut 50. The segmented nut 50 has no extending portion 26; that is, the axial length of the inner nut 16 is equal to that of the outer sleeve 14 plus the collar 30.

Figure 5:
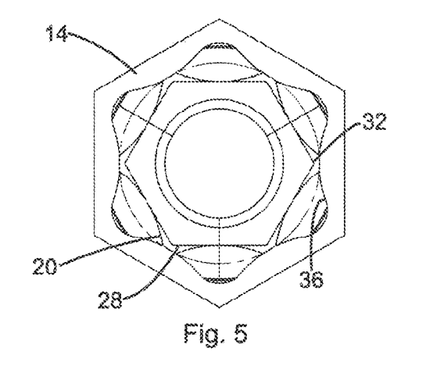
FIG. 5 is an end view of the segmented nut of FIG. 1.
Figure 6:
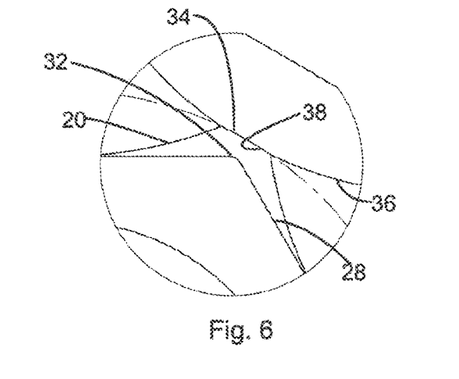
FIG. 6 is an enlarged view of a bearing surface shown in FIG. 5.

The precise nature of the cross sectional shapes of the inner nut 16 and outer sleeve 14 can be seen with reference to FIGS. 5 and 6.

In the outer surface 28 of the extending portion 26, each of the hexagonal sides is flat. In the outer surface 20 of the inner nut 16 within the sleeve 14, each of the hexagonal sides is concave, being aligned with the corresponding surface 28 of the extending portion along the centre of each hexagon side and curving away from the line of the surface 28 towards each hexagon vertex 32.

The distance from a centre line of the inner nut 16 to a vertex 32 of the regular hexagon defined by the outer surface 28 is thus less than the distance from the centre line to a nominal vertex of the hexagon—based shape defined by the outer surface 20.

The inner nut 16 is machined or otherwise formed during assembly to fit within a cylindrical bore having a radius greater than the distance from the centre line to the vertex 32 of the regular hexagon, but less than the distance to the nominal vertex of the hexagon-based shape defined by the outer surface 20. In effect, this means that the vertices of outer surface 20 form convexly rounded bearing surfaces 34. The bearing surfaces 34 are each part cylindrical, having a radius of curvature equal to their actual radius relative to the centre line. Each bearing surface 34 extends through an arc of about 5° to 10°.

In the internal surface 22 of the sleeve 14, each of the hexagonal sides is convex, with each side 36 protruding inwardly towards a centre of the sleeve 14. The distance between the most inward part of one side 36 (at its centre) and that of an opposed side 36 is greater than the distance between opposed vertices 32 of the outer surface 28 of the inner nut extending portion 26, and less than the distance between opposed nominal vertices of the hexagonal-based shape of the inner nut 16.

The internal surface 22 of the sleeve 14 is machined or otherwise formed during assembly to define edges of a cylindrical bore having a radius equal to that of the bearing surfaces 34. This means that the most inward part of each side 36 is machined to form a concave rounded bearing surface 38. The bearing surfaces 38 are each part cylindrical.

In the embodiment shown, the inner nut is threaded with a tapered v-type screw thread. This is the most common type of thread used for industrial fasteners. In use, as a torque is applied to the nut, a tension is induced in the thread of the nut and a corresponding radial force is generated on the each of the inner nut segments, 12, which in turn are constrained by radial forces of the sleeve 14, and which manifest as a hoop stress in the sleeve 14. This arrangement is desirable as the contact pressure between the sleeve 14, and the inner nut segments 12, tends to increase as the tension of the nut is increased and therefore the sleeve 14, is held more firmly in place as the nut tension is increased.

In the embodiment shown, the inner bearing surface 38, of the sleeve and the outer bearing surface of the inner nut 34, contact along a generally circumferential contact patch. This arrangement ensures that forces generated by the inner nut segments 12 on the outer sleeve 14 are predominately or purely of a radial nature and do not induce a torque on the outer sleeve The segmented nut 10 is formed by press fitting the sections 12 into the outer sleeve 14 such that the bearing surfaces 34 of the inner nut 16 bear against the bearing surfaces 38 of the sleeve 14.

It will be appreciated that the press fitting causes the bearing surfaces 34 to act against the bearing surfaces 38 in a radial direction (subject to manufacturing tolerances).

Whilst the radius used for surface 34 and surface 38 may be identical, it will be appreciated that different combinations may be used to provide a degree of control of the release torque required to rotate the outer sleeve 14, to achieve release of the nut 16. Furthermore the circumferential extent of the surfaces 34 and 38 may be chosen to achieve certain characteristics in the required release torque, and/or the release angle of the outer sleeve. For example by having a smaller circumferential extent of the surface 34 an increased pressure loading will occur on this surface and therefore an increased release torque will be required.

A generally bell shaped gap 40 is formed between each vertex of the internal surface 22 of the sleeve 14 and an associated side of the hexagon-based outer surface 20 of the inner nut 16.

Figure 7A:
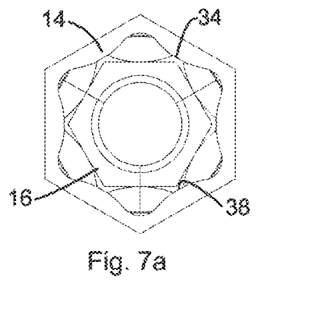
FIG. 7a is an end view of the segmented nut of FIG. 1 shown in a locked position.
Figure 7B:
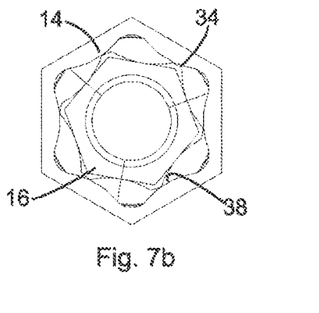
FIG. 7b is an end view of the segmented nut of FIG. 1 shown in a release position.
Figure 7C:
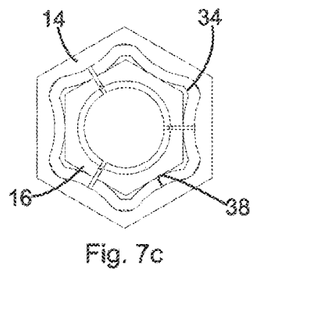
FIG. 7c is an end view of the segmented nut of FIG. 1 shown in a free position.

FIGS. 7a to 7c show sequential rotation of the sleeve 14 relative to the inner nut 16.

In a locked position, as shown in 7a as well as FIGS. 1 and 2, the bearing surfaces 34 and 38 are pressed against each other, creating a frictional engagement which prevents relative rotation.

When a sufficient torque (for example in the nut tightening direction) is applied to the outer sleeve 14 while the inner nut is held relatively stationary, the sleeve 14 will rotate relative to the inner nut 16. When the sleeve has rotated about 10°, this will be sufficient for the bearing surface 38 of the sleeve 14 to pass the bearing surface 34 of the inner nut 16. This is shown in FIG. 7b.

At this position the restraining engagement between bearing surfaces 34 and 38 ceases, and the sleeve is in a release position. From here it can be freely rotated without restraint into a free position as shown in FIG. 7c, being a total rotation of 30°.

In the free position as shown in FIG. 7c there is no force holding the nut sections 12 together, leaving each one free to move radially outwardly.

In a preferred embodiment, the clearances are such that in the free position of FIG. 7c the nut sections 12 are able to move in a radial direction by a distance greater than the depth of the thread on the internal surface of the bore 18 of the inner nut 16. This means that in the free position the nut sections 12 may be moved outside the thread of a bolt onto which the inner nut 16 has been threaded. The released nut sections 12 may then be slid over the bolt in an axial direction.

In an alternative embodiment, the clearances may be tighter and the nut section 12 may be constrained to move in a radial distances less than the depth of the thread on the internal surface of the bore 18 of the inner nut 16. In this embodiment, the released nut sections retain threaded engagement with a bolt, with the effect of release being to loosen the inner nut 16.

It will be observed that the rotational movement of the sleeve 14 relative to the inner nut 16 is not over threads. This means that the nut 10 can be released without any part requiring movement along a thread. This is considered highly desirable, particularly in caustic environments. It will be further observed that the outer sleeve is also not required to move along any exposed surface. This is also considered highly desirable.

Figure 15A:
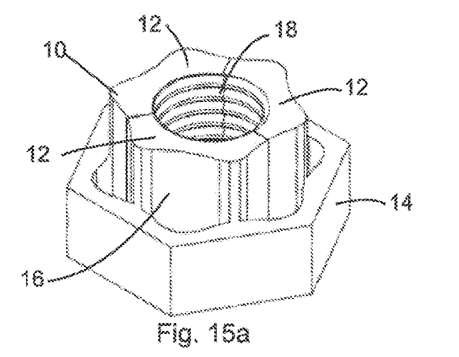
FIG. 15a is a segmented nut in accordance with a sixth embodiment of the present invention.
Figure 16A:
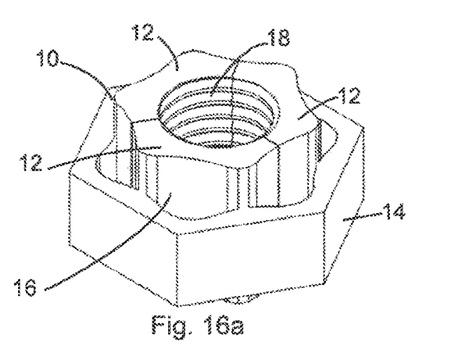
FIG. 16a is a segmented nut in accordance with a seventh embodiment of the present invention.
Figure 17A:
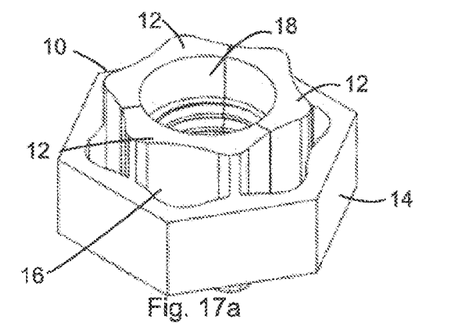
FIG. 17a is a segmented nut in accordance with an eighth embodiment of the present invention.

In order to assist the radial outward movement of the nut sections 12, the segmented nut 10 includes a biasing means, in this embodiment being a conical washer 42 arranged to be pressed into the collar 30 during tightening of the nut 10 in use. The conical washer 42 is arranged to urge the sections 12 apart when the sleeve 14 is rotated into the release position. The conical washer may also be used without the need of a collar incorporated into the inner nut design, for example the conical washer may be used in conjunction with the embodiments shown in FIGS. 15, 16 & 17.

In order to guard against inadvertent movement of the sleeve 14 into the release position, some embodiments of the invention propose the use of a pin 44. In the embodiment of FIG. 1, a pin 44 is located in a slot machined into one of bearing surfaces 34. The pin 44 has an axial length about one third that of the sleeve 14. The inner nut 16 includes an axially aligned recess 46 located behind the pin 44. The arrangement is such that the pin 44 can be pushed from outside the sleeve 14 into the recess 46, allowing rotation of the sleeve 14.

An alternative pin 52 is shown in the embodiment of FIG. 4. This pin 52 has a body portion 54 shaped to locate within a gap 40, and an arm portion 56 arranged to locate outside the sleeve 14. The pin 52 can be removed by engaging the arm portion 56 and pulling the pin out.

Figure 8:
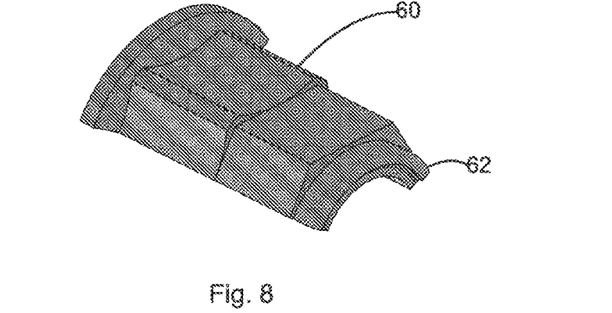
FIG. 8 is a view of a nut section in accordance with a third embodiment of the present invention.
Figure 9:
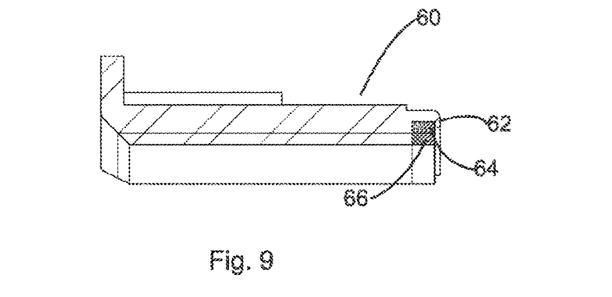
FIG. 9 is a side cross section along the nut section of FIG. 8.

A further embodiment of the present invention is shown in FIGS. 8 and 9. FIGS. 8 and 9 show a nut section 60 similar to the nut section 12 of the first embodiment. The nut section 60 has an additional outer flange 62, arranged to be bent inwardly to form a circumferential groove 64 at an outer end of the nut section 60. This groove is arranged to receive a nylon insert 66 for prevailing torque/anti-rotation purposes.

One method of manufacturing the segmented nut of the present invention includes the steps of press fitting the nut sections 12 or nut sections 60 into a sleeve 14, and then machining an internal thread within the inner nut 16. It is anticipated that the nylon insert 66 could be cut into three portions corresponding to the nut sections 60 during this machining operation.

An alternative method of manufacturing involves forming the thread within each nut section 12 before assembly. This could be by stamping, casting, 3D printing, CAD/CAM machining or other suitable process able to achieve required tolerances. It is considered that such a method would enable the provision of otherwise difficult-to-machine threads on the inner nut, such as a saw-tooth thread or other direction-specific threads.

It will be appreciated that in embodiments shown it is not desirable to apply a tightening torque to the outer sleeve during application of the nut to a work piece as this may result in a release of the sleeve before the required nut tightening torque is reached (i.e. the sleeve release torque being reached before the required nut tightening torque has been reached).

Figure 10:
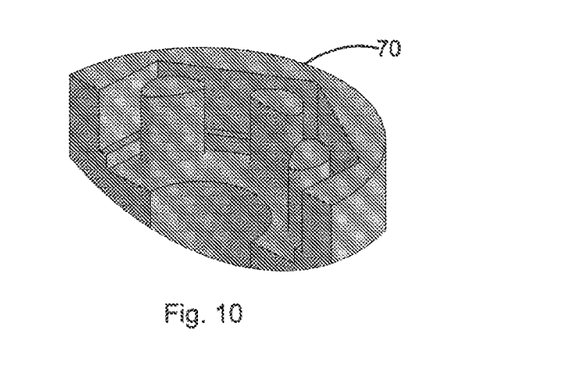
FIG. 10 is a portion of a tool for use with the segmented nut of FIG. 1.

Segmented nuts 10 having an extending portion 26 may be screwed into position on a bolt by the use of a spanner or other standard tool on the extending portion 26. Segmented nuts 50 without an extending portion 26 may require the use of a dedicated tool for tightening, such as that shown in FIG. 10. FIG. 10 shows a portion of a tightening tool 70 having prongs arranged to locate within gaps 40 of the segmented nut 50. The tool 70 can then be rotated using known means. The tightening tool 70, or a modification thereof (not shown), may also be used with nuts that have an extended portion 26 as shown in FIGS. 1-3, in which case the tool 70 assists in maintaining the relative position of the sleeve 14, and inner segments 16, during the nut tightening procedure—which may undergo severe rotational vibrations e.g. during use of a rattle gun.

Rotation of the outer sleeve 14 may be achieved by using a spanner or similar tool. This may require the holding of the inner nut, either by a smaller spanner on an extending portion 26 or by a tool 70.

In an alternative embodiment (not shown), the outer sleeve has a cylindrical outer surface with apertures or slots into which a dedicated tool (such as a C-spanner or a hook spanner) may be inserted. This may reduce the risk of a user inadvertently releasing the segmented nut 10 when they intend to tighten it on a bolt.

In the embodiments discussed above it will be appreciated that the outer sleeve may be rotated in either direction in order to move to a release position. This provides the user a degree of flexibility in choosing which mode of nut release is most appropriate for the circumstances. For example, if the nut and thread are generally in good condition, rotation of the outer sleeve in the nut untightening direction may result in the nut being removed from the bolts without the inner nut segments becoming free. Thus the nut can be removed as a single piece and could, subject to applicable regulations regarding the re-use of nuts, be re-used. If however the nut was to become stuck, continued application of torque to the outer sleeve (and subject to the bolt thread not also rotating) would release the inner nuts. In another embodiment (not shown), the bearing surfaces 34 and 38 are shaped so as to permit movement in only one direction. It is anticipated that this will be in the direction of tightening of the nut on the bolt.

In general, the nut 10 of the embodiments disclosed above may be released from a bolt in four different ways: by rotation of the outer sleeve 14 relative to the inner nut 16 in the tightening direction of the nut; by rotation of the outer sleeve 14 relative to the inner nut 16 in the loosening direction of the nut (this may require the inner nut 16 to be held relatively stationary, for instance by the use of one spanner on the outer sleeve and another on the inner nut); by axial movement of the outer sleeve 14 relative to the inner nut 16 (that is, in the reverse of the assembly of the nut 10); and by rotation of the outer sleeve together with the inner nut 16 in the loosening direction (that is, removing the nut 10 as a traditional nut).

It is anticipated that potting material such as silicone or a frangible material may be used within the gaps 40, both to reduce the risk of dust or debris entering the gaps 40 and also to increase the torque required to move the sleeve 14 into the release position. This reduces any risk of inadvertent release.

Figure 11:
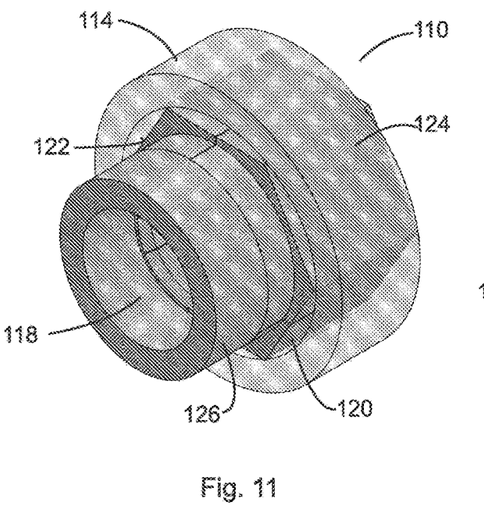
FIG. 11 is a segmented nut in accordance with a fourth embodiment of the present invention.
Figure 12:
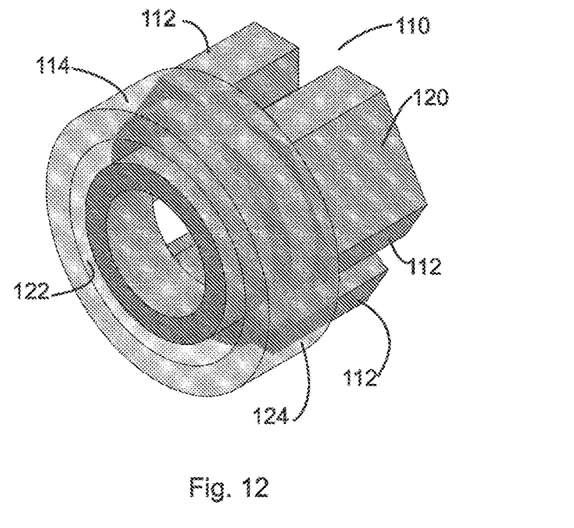
FIG. 12 is a perspective of the segmented nut of FIG. 11, shown during release.

FIGS. 11 and 12 show a segmented nut 110 formed by three nut sections 112 and an outer sleeve 114.

Each nut section 112 is part-cylindrical, having an arc of 120°, with a concave inner surface and a convex outer surface. When placed together, as shown in FIG. 1, the nut sections combine to form an inner nut 116. The inner nut 116 has a cylindrical internal bore 118, formed by the concave inner surfaces, which is threaded so as to be received about the threaded end of a bolt or other externally threaded member.

The inner nut 116 has an outer surface 120 which is polygonal in cross section, being regular hexagonal in the embodiment shown. Each of the generally convex outer surfaces of the nut sections 112 includes a full hexagon side, and two half hexagon sides.

The outer sleeve 114 is annular in cross section, with an internal bore 122 and an external surface 124. Both the internal bore 122 and the external surface 124 are cylindrical, with the internal bore 122 being slightly larger in dimension than the outer surface 120 of the inner nut 116.

The outer sleeve 114 has an axial length approximately half that of the inner nut 116. The inner nut 116 has an extending portion 126 axially adjacent the outer sleeve 114. The extending portion 126 is cylindrical, with an outer diameter less than that of the hexagonal portion of the inner nut 116

In use, the nut sections 112 are placed together to form the inner nut 116, and the outer sleeve 114 is slid around the outer surface 120 of the inner nut in order to hold the nut sections 112 together. In this configuration, the segmented nut 110 can be applied to a bolt by operation of a socket wrench or similar about the external surface 120.

When release of the nut is required, the sleeve 114 can be pressed forward on the bolt, over the extending portion 126. This acts to release the nut portions 112, allowing them to fall away.

Figures 13, 14:
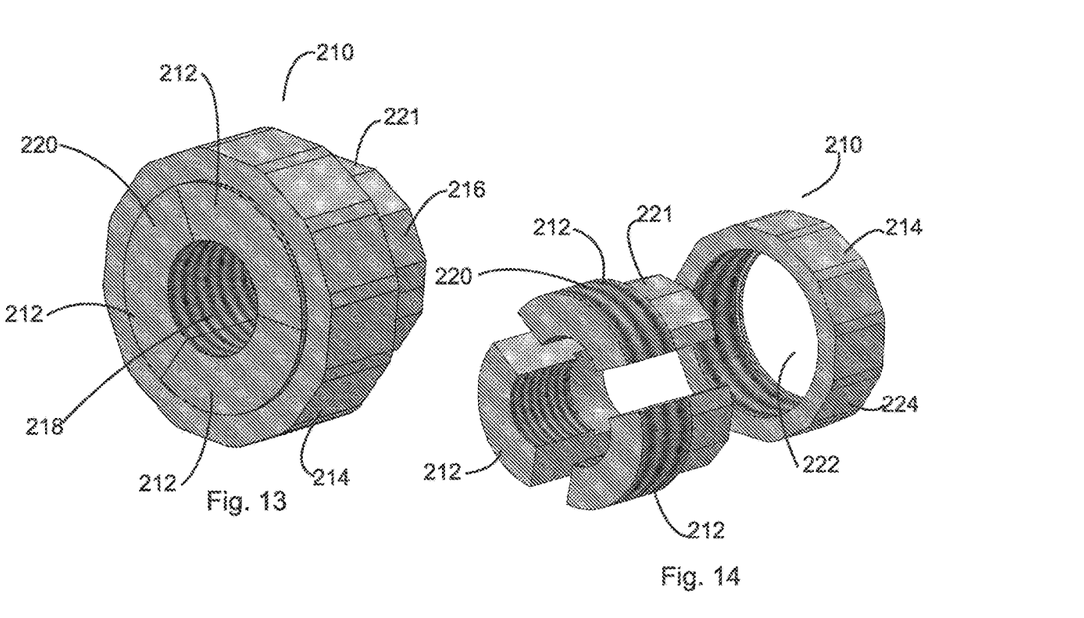
FIG. 13 is a segmented nut in accordance with a fifth embodiment of the present invention.
FIG. 14 is an exploded view of the segmented nut of FIG. 13.

FIGS. 13 and 44 show a segmented nut 210 formed by three nut sections 212 and an outer sleeve 214.

Each nut section 212 is part-cylindrical, having an arc of 120°, with a concave inner surface and a convex outer surface. When placed together, as shown in FIG. 3, the nut sections combine to form an inner nut 216. The inner nut 216 has a cylindrical internal bore 218, formed by the concave inner surfaces, which is threaded so as to be received about the threaded end of a bolt or other externally threaded member.

The inner nut 216 has a stepped outer surface, with a first portion 220 which is cylindrical, and externally threaded, and a second portion 221 which is regular dodecagonal in cross section, and smaller in cross sectional dimension than the first portion 220. The threads on the first portion 220 are oriented in the opposite direction to those of the bore 218.

The outer sleeve 214 is annular in cross section, with an internal bore 222 and an external surface 224. The internal bore 222 is cylindrical, and internally threaded with threads which are complementary in size and shape to those on the first portion 220 of the outer surface of the inner nut 216. The external surface 224 is regular dodecagonal in cross section.

The outer sleeve 214 has an axial length approximately half that of the inner nut 216. The axial length of the outer sleeve 214 is approximately equal to that of the first portion 220 of the outer surface of the inner nut 216.

In use, the nut sections 212 are placed together to form the inner nut 216, and the outer sleeve 214 is rotated about the first portion 220 of the outer surface of the inner nut 216 in order to hold the nut sections 212 together. In this configuration, the segmented nut 210 can be applied to a bolt by operation of a socket wrench or similar about the second portion 221 of the outer surface of the inner nut 216. The torque applied to the inner nut 216 will cause rotation of the segmented nut 210 about the bolt.

The segmented nut 210 can thus be tightened as much as is desirable.

When release of the nut is required, a further torque can be applied to the outer sleeve 214, causing it to rotate relative to the inner nut 216 until it is removed from the first portion 220. As the threads are oriented in a different direction, releasing rotation of the outer sleeve 214 occurs in the same angular direction as tightening rotation of the inner bolt 216. Release of the outer sleeve 214 causes the nut sections 212 to fall apart.

FIGS. 15 to 18 show other embodiments of the segmented nut 10, in which the thread within the internal bore 18 is varied for different applications.

Figure 18A:
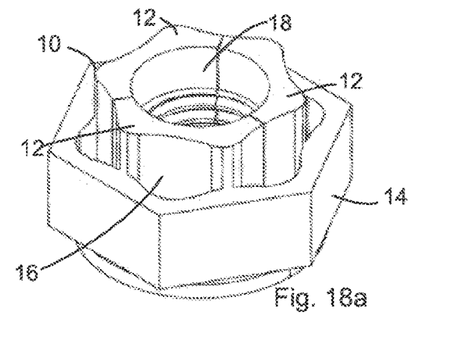
FIG. 18a is a segmented nut in accordance with a ninth embodiment of the present invention.
Figure 19A:
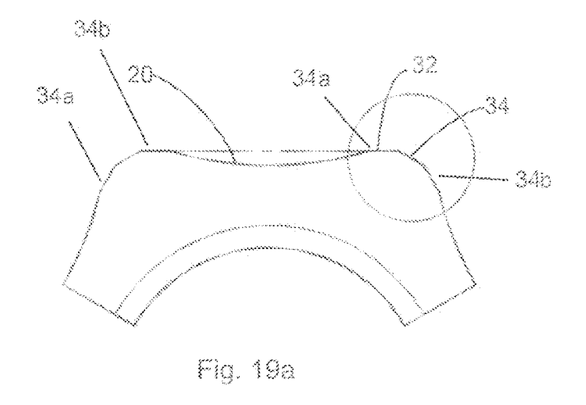
Figure 19B:
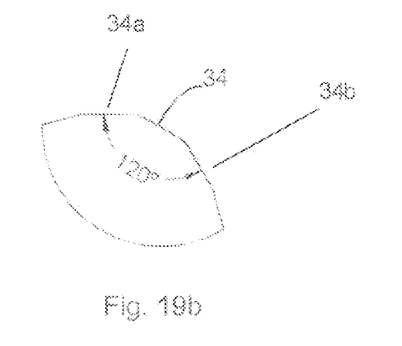

In each of FIGS. 15 to 18 the inner nut 16 is formed with bearing surfaces 34 being rounded and with small flat sections 34a and 34b either side and extending axially, as shown in FIG. 19. With this shape the extending portion 26 can be a continuation of the shape of the inner nut 16, allowing nut sections 12 to be extruded with constant cross-sectional shape. Further, the inner nut 16 of FIGS. 15 to 17 does not use a radial collar 30. The small flat sections 34a and 34b provide a tool engagement surface for use with conventional spanners and/or sockets.

Figure 15B:
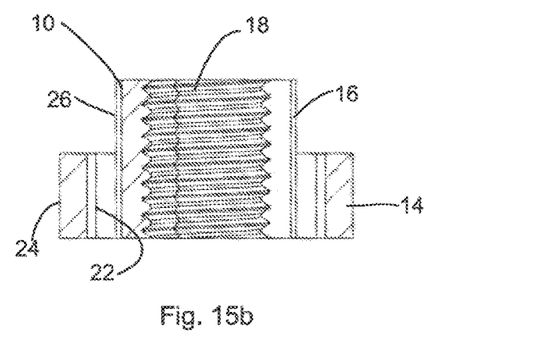

The inner nut 16 of FIG. 15 has an internal bore 18 which is threaded through its entire length.

Figure 16B:
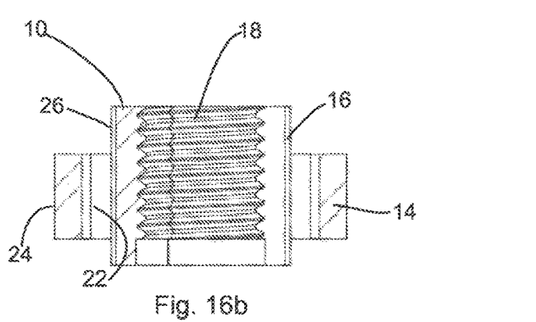

The inner nut 16 of FIG. 16 has an internal bore 18 which has an unthreaded introductory portion. The outer sleeve 14 of FIG. 16 sits slightly back of an inner end of the nut 10, with the beginning of the thread being arranged to align axially with the outer sleeve 14.

Figure 17B:
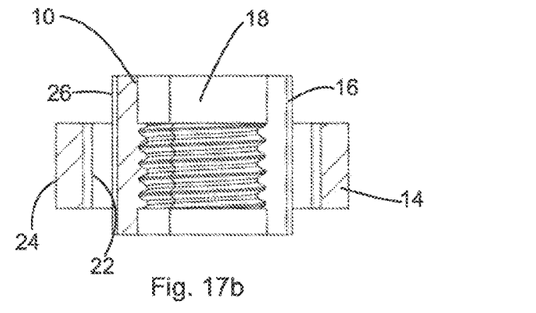
Figure 18B:
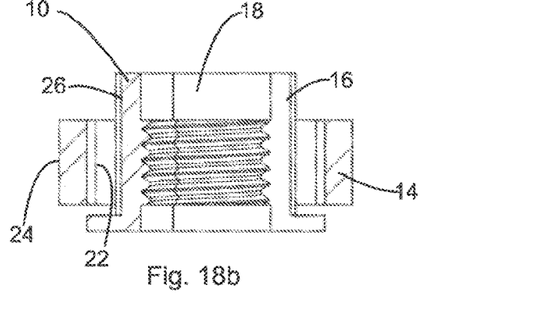

The inner nuts 16 of FIGS. 17 and 18 each have an internal bore 18 where the entirety of the threaded portion is within the outer sleeve 14.

It will be appreciated that the loading of the thread of the inner nut 16 is largely taken by the first few engaged threads. For this reason, it is considered desirable to ensure that these threads are contained within the outer sleeve 14. In this way, load applied via the threads will act to increase the radial bearing force between the inner nut 16 and the outer sleeve 14.

Figure 20A:
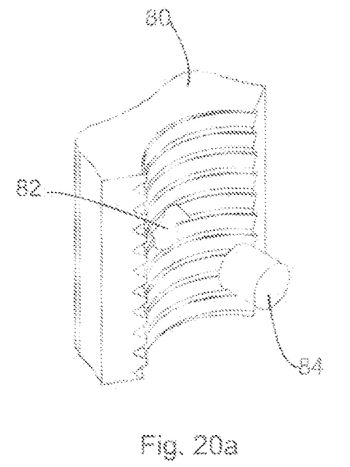
FIG. 20a is a view of a nut section in accordance with a tenth embodiment of the present invention.
Figure 20B:
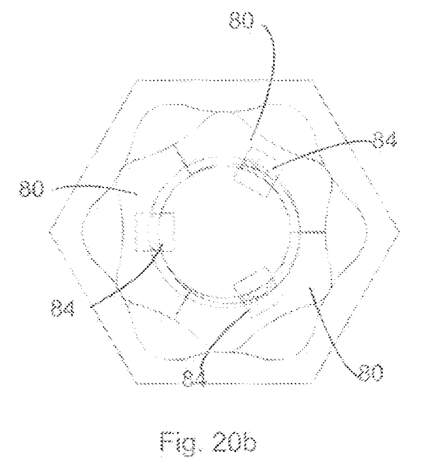

A still further embodiment of the present invention is shown in FIGS. 20a and 20b. FIGS. 20a and 20b show a nut section 80 similar to the nut section 12 of the first embodiment. The nut section 80 has a central aperture 82, into which a nylon plug 84 may be fitted. The nylon plug 84 may act as a prevailing torque/anti-rotation device, negating the need for the insert described in relation to FIGS. 8 and 9.

Figure 21A:
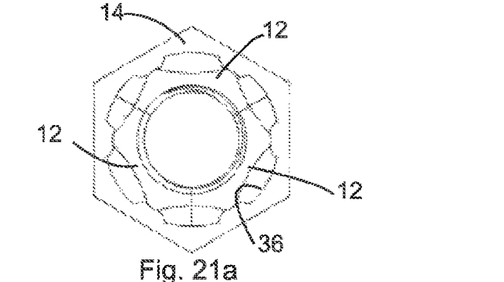
FIG. 21a is an end view of a nut in accordance with an eleventh embodiment of the present invention, shown in a locked position.
Figure 21B:
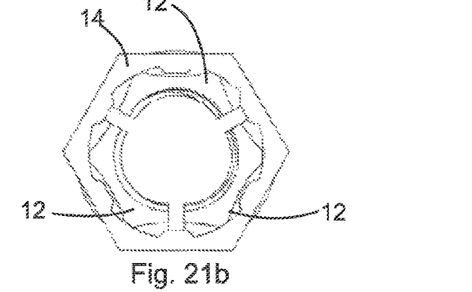
FIG. 21b is an end view of the nut of FIG. 21a, shown in a release position.
Figure 22A:
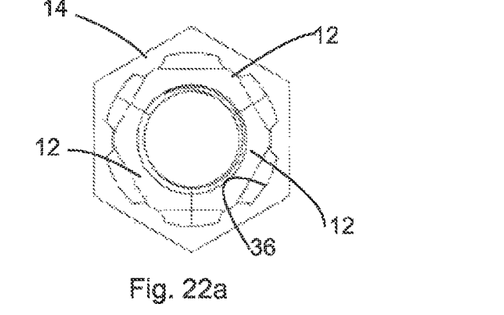
FIG. 22a is an end view of a nut in accordance with a twelfth embodiment of the present invention, shown in a locked position.
Figure 22B:
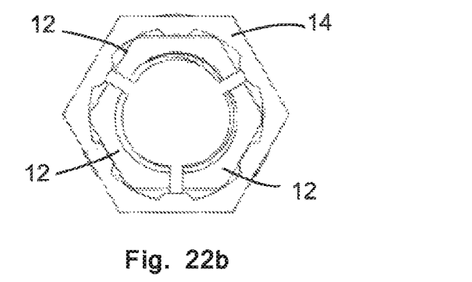
FIG. 22b is an end view of the nut of FIG. 22a, shown in a release position.
Figure 23A:
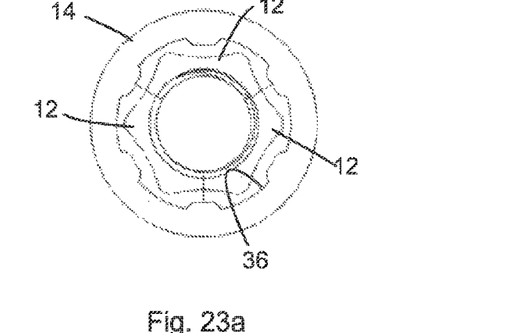
FIG. 23a is an end view of a nut in accordance with a thirteenth embodiment of the present invention, shown in a locked position.
Figure 23B:
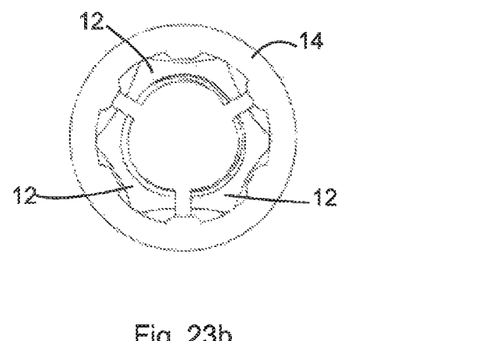
FIG. 23b is an end view of the nut of FIG. 23a, shown in a release position.

Further embodiments of the present invention are shown in FIGS. 21 to 23. These figures show a nut where the sides 36 of the sleeve 14 are only slightly curved, and where the radial distance the nut sections 12 can travel on release is greatly diminished relative to the earlier embodiments. It is anticipated that these nut may require the sleeve 14 to be moved axially between a narrow release position and a free position. These designs allow for a more regular nut shape, such as the hexagonal inner nut of FIG. 22. It also allows for a significantly stronger sleeve with the same outer dimension.

Modifications and variations as would be apparent to a skilled addressee are deemed to be within the scope of the present invention.

Having described the invention, the following is claimed:

1. A segmented nut comprising:
   at least three sections, each of the sections having a concave internal surface and an outer surface, such that the sections combine to form an inner nut having a cylindrical internal surface which is at least partially threaded and is arranged for threaded rotation around a threaded shaft, and a combined outer surface; and
   a sleeve located around the inner nut, the sleeve having an internal surface having at least one restraining surface associated with each said section, the at least one restraining surface arranged to prevent movement of the associated said section in a radial direction;
   wherein the sleeve is arranged and configured to act against the sections of the inner nut to maintain the sections together in fixed relationship to each other and to the sleeve when the segmented nut is assembled prior to application to the threaded shaft and during threading application of the segmented nut along the threaded shaft;
   the sleeve being moveable relative to the inner nut, by rotation, into a release position in which at least one of the sections is able to move in a radial direction,
   wherein the inner nut has an axial length greater than that of the sleeve.

2. A segmented nut as claimed in claim 1, wherein the rotational movement of the sleeve relative to the inner nut is not along a thread.

3. A segmented nut as claimed in claim 1, wherein the movement of the sleeve from the locked to the release position is by axial movement in addition to rotation.

4. A segmented nut as claimed in claim 1, wherein the sleeve has an outer surface forming a polygon.

5. A segmented nut as claimed in claim 4, wherein each restraining surface is located internally of a midpoint of a side of the polygon.

6. A segmented nut as claimed in claim 4, wherein the outer sleeve is a hexagon.

7. A segmented nut as claimed in claim 1, wherein movement of the sleeve into its release position can be effected by rotation relative to the inner nut of less than 90°.

8. A segmented nut as claimed in claim 7, wherein movement of the sleeve into its release position can be effected by rotation relative to the inner nut of less than 45°.

9. A segmented nut as claimed in claim 1, wherein the nut includes a plurality of gaps between the inner nut and the sleeve.

10. A segmented nut as claimed in claim 1, wherein the threaded portion of the inner nut has an axial length equal to that of the sleeve.

11. A segmented nut as claimed in claim 1, wherein the threaded portion of the inner nut has an axial length less than that of the sleeve.

12. A segmented nut as claimed in claim 1, wherein the respective restraining surface acts against the inner nut in a radial direction.

13. A segmented nut as claimed in claim 1, wherein the nut includes at least one friction increasing member located along the thread of the internal surface.

14. A segmented nut as claimed in claim 1, wherein at least one said section has a concave outer surface between two bearing surfaces of the respective section.

15. The segmented nut as claimed in claim 14, wherein each of the at least three sections of the inner nut includes a said concave outer surface between two said bearing surfaces of the respective section.

16. A segmented nut as claimed in claim 1, wherein the at least one restraining surface of the sleeve is arranged and configured to act against at least two bearing surfaces of each of the sections.

17. The segmented nut as claimed in claim 1, wherein the axial length of the inner nut provides an extending portion to receive a tool for rotationally tightening the segmented nut.

\* \* \* \* \*